May 13, 1952 D. J. HILFERTY 2,596,149

ELECTRICAL WAVEFORM GENERATOR

Filed April 10, 1946 3 Sheets-Sheet 1

INVENTOR.
ETHEL M. HILFERTY
EXECUTRIX OF THE ESTATE
OF DANIEL J. HILFERTY, DECEASED

BY M. C. Hayes
ATTORNEY

May 13, 1952 D. J. HILFERTY 2,596,149

ELECTRICAL WAVEFORM GENERATOR

Filed April 10, 1946 3 Sheets-Sheet 2

INVENTOR.
ETHEL M. HILFERTY
EXECUTRIX OF THE ESTATE
OF DANIEL J. HILFERTY, DECEASED

BY M. A. Hayes
ATTORNEY

May 13, 1952 D. J. HILFERTY 2,596,149

ELECTRICAL WAVEFORM GENERATOR

Filed April 10, 1946 3 Sheets-Sheet 3

*INVENTOR.*
ETHEL M. HILFERTY
EXECUTRIX OF THE ESTATE
OF DANIEL J. HILFERTY, DECEASED
BY M. A. Hayes
ATTORNEY Patented May 13, 1952

2,596,149

UNITED STATES PATENT OFFICE 2,596,149

ELECTRICAL WAVEFORM GENERATOR

Daniel J. Hilferty, deceased, late of Riverdale, Md., by Ethel M. Hilferty executrix, Riverdale, Md.

Application April 10, 1946, Serial No. 661,044

5 Claims. (Cl. 250—27)

(Granted under the act of March 3, 1883, as amended April 30, 1928; 370 O. G. 757)

This invention relates in general to electronic control circuits and in particular to electronic step wave generators.

It is frequently necessary in radar, television, and other fields employing cathode ray tubes to utilize auxiliary circuits which function in synchronism with related circuits. Those familiar with the art will immediately realize the uses of the step wave generator taught by this invention in addition to those suggested here. By using the step wave generator with a pulse forming circuit it is possible to obtain a group of pulses as explained in the subsequent description.

It is an object of this invention to provide a simple electronic step wave generator.

It is another object of this invention to provide an electronic generator the output of which varies between a plurality of constant electrical energy levels in a predetermined manner.

It is still another object of this invention to provide apparatus for the production of a group of signals of selectable group structure.

It is still another object of this invention to provide apparatus for the sequential control of a plurality of vacuum tubes.

Figure 1:
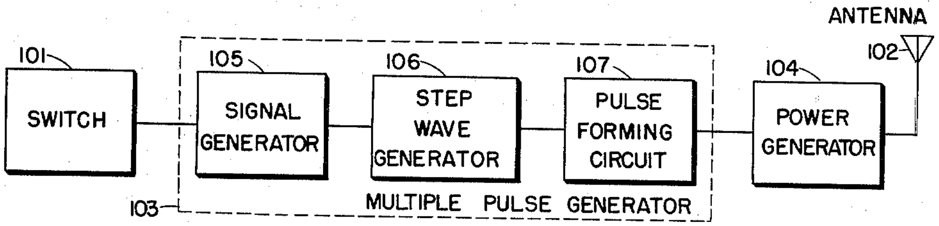
Figure 3:
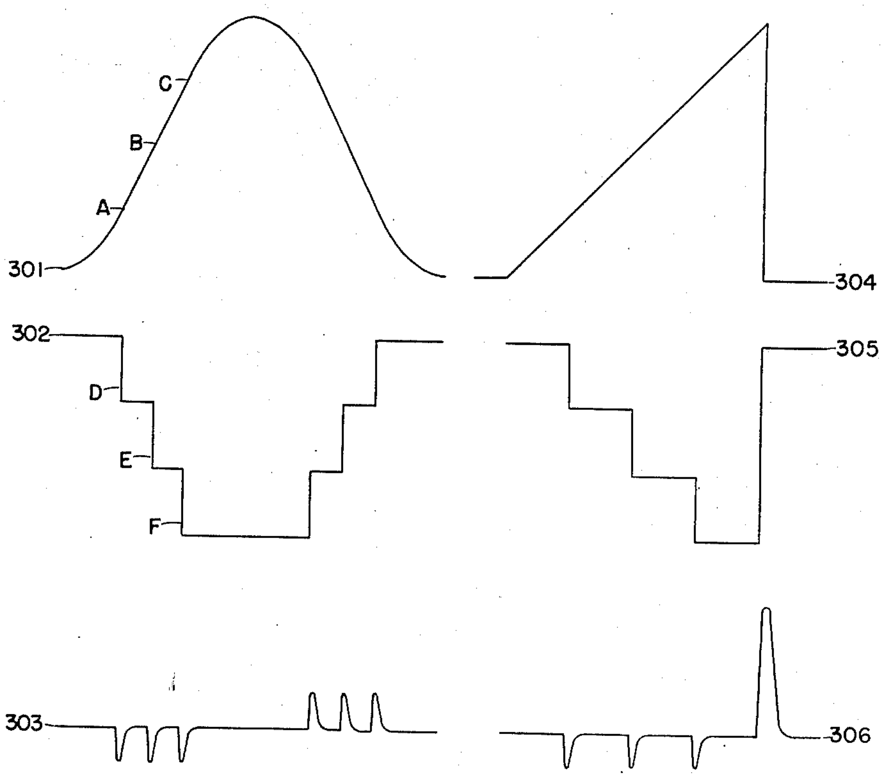
Figure 2:
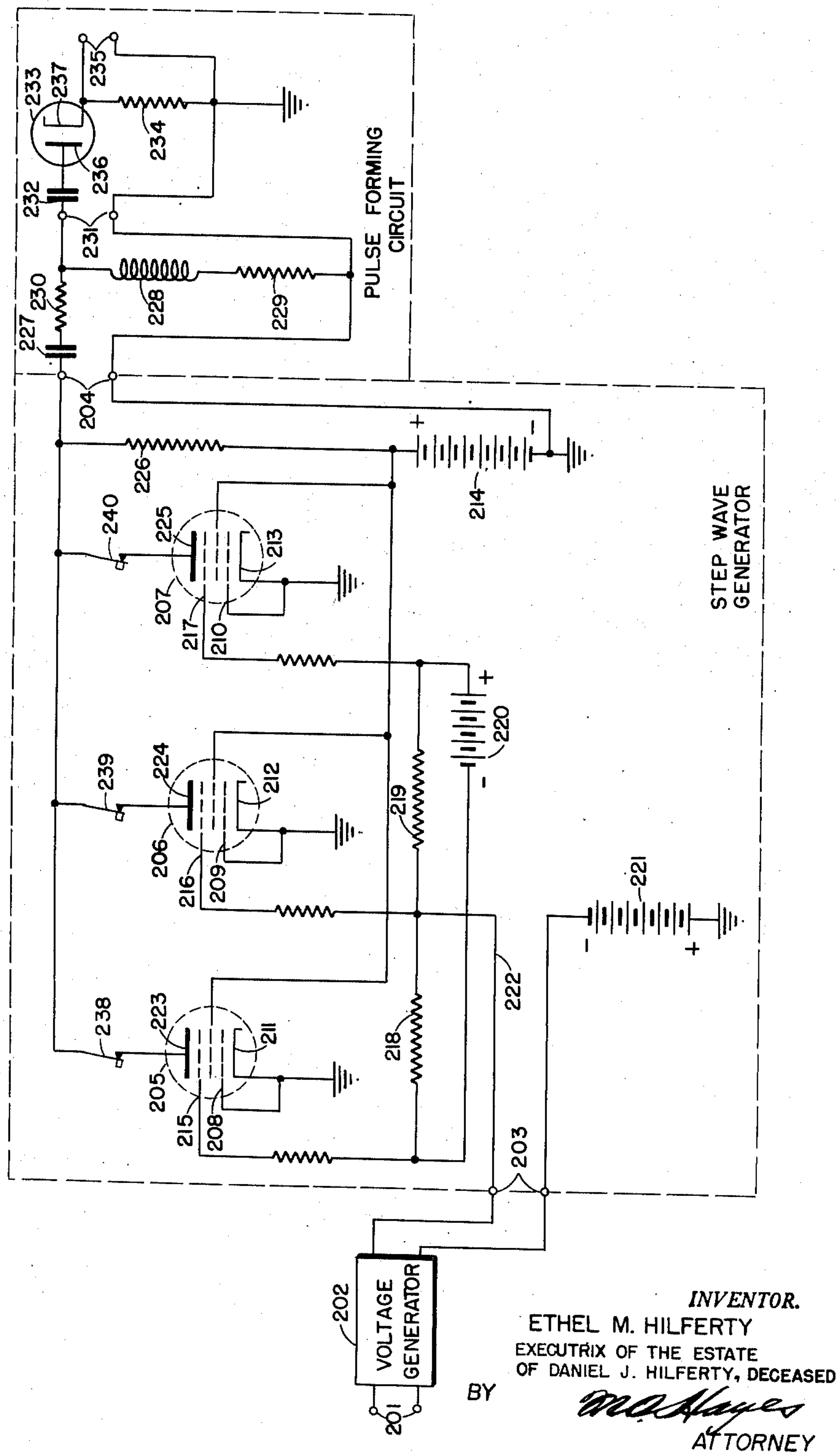
Figure 4:
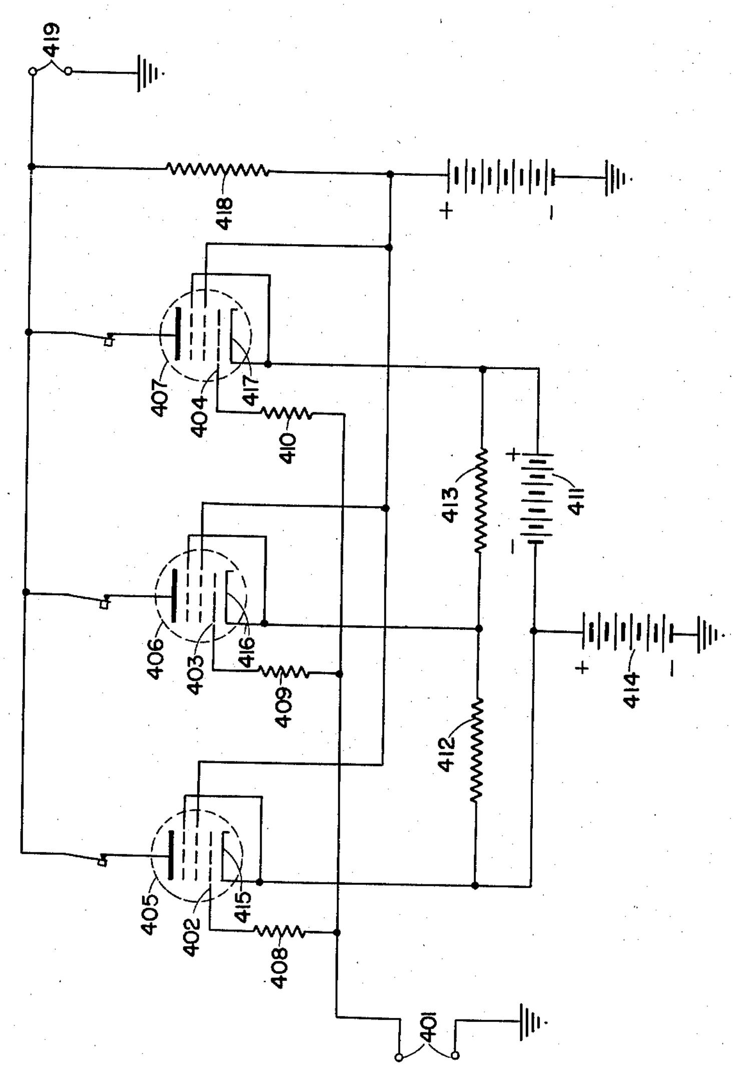

Other objects and features of the present invention will become apparent upon a careful consideration of the following description when taken together with the accompanying drawings in which:

Figure 1 shows a block diagram of a system incorporating typical features of the present invention, Figure 2 shows a circuit diagram of an exemplary embodiment of this invention when used as a multiple pulse generator, Figure 3 shows a series of waveforms useful in explaining the circuit of Figure 2, and Figure 4 shows another exemplary embodiment of this invention.

In accordance with the fundamental concepts of the present invention an electronic step wave generator is provided capable of deriving a step-wise signal voltage variation from an electrical signal voltage which varies substantially linearly with respect to time over a part of its repetitive cycle. In the operation of the system the linearly varying electrical signal is applied simultaneously to the control elements of a plurality of electronic tubes whose associated circuits are so constructed that different and distinct magnitudes of the linearly varying electrical signal change the state of conduction of the individual electronic tubes. The electronic tubes have a common output circuit which registers the change in state of conduction in the form of a series of abrupt changes of output signal, the waveform of which is of a step-wise form, one step being present for each electronic tube in the circuit. In order that the steps be uniform in the case where a step-wise voltage variation is desired it is necessary that the electronic tubes have the characteristics of constant plate current flow over a large range of plate voltage.

Figure 1 shows a block diagram of a radio transmitter in which is employed a multiple pulse generator incorporating a step wave generator constructed according to the teachings of this invention. This apparatus may be of the pulse communication type in which switch 101 such as a mechanical telegraph key or suitable electronic switch may be closed to cause the transmission of a group or groups of pulses from antenna 102. Switch 101 controls the multiple pulse generator 103 which operates to pulse modulate the power generator 104, which may be of any conventional type designed in accordance with the characteristics of the desired transmission. In this embodiment of the invention the multiple pulse generator 103 comprises a signal generator 105, the step wave generator 106 and a pulse forming circuit 107. Signal generator 105 is responsive to switch 101 to produce a recurrent signal which may take any of several forms such as a sinusoidal or saw tooth waveform. Step wave generator 106 is responsive to the output from signal generator 105 to produce a signal which varies in a series of abrupt step-wise excursions. Pulse forming circuit 107 is responsive to the step wave output of generator 106 to produce a group of pulses of selectable number, duration and spacing for modulating the power generator 104.

Figure 2 shows in detail components of the multiple pulse generator similar to 103 of Figure 1. In Figure 2 input terminals 201 are provided for applying an operation initiating signal to voltage generator 202. Voltage generator 202 when operating produces a recurrent voltage which preferably varies linearly with respect to time during a part of its period. This voltage is applied to the input terminals 203 of the step wave generator. In the typical embodiment shown the step wave generator includes three electron tubes having common output terminals 204. Three pentode tubes 205, 206 and 207 are used in this embodiment although any reasonable number may be used depending upon the number of pulses desired in each group. The control grids 208, 209 and 210 of the pentode tubes are connected to their respective cathodes 211, 212 and 213 which are in turn connected to ground. The screen grids of the tubes are connected to a suitable positive voltage, in this case to the plate voltage supply 214. The high screen grid voltage and the zero control grid bias voltage will cause heavy plate circuit conduction in the pentode tubes except when the voltages on the suppressor grids 215, 216 and 217 are at a very low potential.

The suppressor grids 215, 216 and 217 are connected to a closed series circuit comprising resistances 218 and 219 and a voltage source 220. Resistances 218 and 219 are selected of substantially equal value if equal time spacing of output steps is desired. The source of additional biasing voltage 221 is connected in the circuit through voltage generator 202 to maintain the suppressor grids of all the pentode tubes at such a potential that the state of conduction thereof can be changed by the application of the desired signal between terminals 203. By change in state of conduction it is meant that the tubes are driven from saturation to cut off or from cut off to saturation as the case may be.

When an input signal varying linearly with respect to time is applied via the connection 222 to the voltage divider circuit of resistances 218 and 219 the pentode tubes will be brought to conduction sequentially as the signal rises and they will be cut off sequentially as the signal decreases, the interval between the change in state of conduction of one tube and that of the next depending on the rate of change of the input voltage with respect to time. Since anodes 223, 224 and 225 of the tubes are connected in parallel through a common load resistance 226 to plate voltage supply 214, the current flow through resistance 226 rises in a stepwise manner as successive tubes are brought into conduction by the linearly varying signal. Since the electronic tubes used are pentodes and have constant current characteristics over a wide range of plate voltage variation, the voltage across the plate load resistance 226 drops in uniform steps as successive tubes are brought into conduction. Similarly, if the input voltage decreases linearly from a value at which all pentode tubes are conducting to a value at which they are all cut off the plate voltage increases in uniform steps. This step-wise voltage change is the output signal of the step wave generator at the terminals 204.

The pulse forming circuit shown in Figure 2 has a series resonant circuit which is critically damped. It includes a capacitance 227 and an inductance 228. The resistance 229 represents the inherent ohmic resistance of the inductance. Critical damping of the series circuit is produced by this resistance and an additional resistance 230 which may be added if necessary. When the step-wise voltage variation is applied to the pulse forming circuit a positive pulse is produced across terminals 231 for each sudden voltage rise and a negative pulse is produced for each sudden voltage drop.

In some cases the signal produced at terminals 231 may be directly applied to the transmitter 104 or in other cases additional pulse shaping elements may be advantageous. As an example of further pulse forming circuits a negative limiter or clipper comprising a coupling capacitance 232, a diode tube 233 and a resistance 234 may be employed to produce an output signal at terminals 235 which is devoid of any negative pulses present at terminals 231. Only when the anode 236 of tube 233 is more positive than the cathode 237 will the tube conduct to give an output across resistance 234. Negative pulses therefore do not appear at the output terminals 235.

Switches 238, 239 and 240 are provided for preventing the operation of the associated pentode tubes 205, 206 and 207 when it is desired to eliminate any particular pulses of the group.

The spacing between the pulses in a group can be altered at will by adjusting the rate of change of the voltage applied to the terminals 203. The pulse width can be controlled by changing the circuit constants of the elements comprising the pulse forming circuit.

In Figure 3 is shown a series of waveforms which illustrate more fully the operation of the circuit of Figure 2. Waveform 301 represents a typical sinusoidal voltage produced by the voltage generator 202 and applied to the step wave generator input terminals 203. Waveform 302 represents the voltage at the terminals 204 of the step wave generator as a result of the variation of input voltage. Waveform 303 represents the output voltage of the pulse forming circuit at terminals 231 the pulses being initiated in coincidence with the sudden changes in voltage in waveform 302.

Waveform 304 represents a sawtooth voltage applied to the input terminals 203. Waveforms 305 and 306 represent the signals at the terminals 204 and 231 respectively as a result of the application of the voltage signal of waveform 304 to the circuit of Figure 2.

As the sinusoidal voltage signal of waveform 301 varies from a minimum value to a more positive value it reaches a point different for each tube where the total of the static suppressor bias voltage from 221 and the sinusoidal voltage from generator 202 permits the tube to conduct. The net biasing voltage for the initial conduction of all electron tubes is the same. However, the net value is attained at a different time with respect to the start of the linearly varying waveform because of the voltage drop through resistances 218 and 219 of Figure 2. The voltage levels of the input changing waveform 301 at which each of tubes 207, 206 and 205 starts conduction are indicated by letters A, B and C respectively. On waveform 302 the sudden change in voltage as each pentode tube starts to conduct is shown by vertical lines D, E and F. The resulting voltage drops represented on waveform 302 are not actually instantaneous as shown but require a small amount of time because of stray capacitance in the circuit and also the controlling effect of each suppressor grid as the flow of plate current during the short period of time required to drive the respective tubes from initial conduction to saturation.

A similar step-wise voltage variation is produced as the tubes are cut off sequentially by the sinusoidal voltage signal as it varies from a maximum value.

Pulses produced at terminals 231 by the sudden change of voltage at the beginning of each step are represented on waveform 303. Negative pulses are produced by the sudden decreases of voltage and positive pulses are produced by the sudden increases of voltage.

Waveforms 304, 305 and 306 are included to illustrate the operation of the circuit of Figure 2 upon the application thereto of a positive going sawtooth waveform instead of the sinusoidal waveform. In the sawtooth voltage represented the sudden change at the end of the sawtooth causes all the pentode tubes to be cut off simultaneously to give a large rise in plate voltage as shown on waveform 305. Since the large amplitude pulse resulting as shown on waveform 306 is of the opposite potential to the multiple pulses it may be removed by limiter action if desired.

The circuit of Figure 4 shows another embodiment of the step wave generator in which the control grids of the electronic tubes are used for controlling the operation of the circuit. In this representation three pentode tubes are used which are operated according to their prescribed characteristics with suppressor grids connected to the cathodes and the screen grids at a proper positive potential. A suitable voltage source supplies to the input terminals 401 a recurrent signal which varies substantially linearly with respect to time during a part of its period. The input signal is coupled to each of the control grids 402, 403 and 404 of the pentode tubes 405, 406 and 407 through the limiting resistances 408, 409 and 410. The source of voltage 411 in series with resistances 412 and 413 and in combination with a supplementary source of biasing voltage 414 holds each of the cathodes 415, 416 and 417 at a different potential with respect to ground. As the input signal varies typically from a negative value to a positive value the control grids rise until each reaches a voltage slightly higher than its cathode. When this occurs, grid current drawn by the tubes flows through the limiting resistances preventing further rise of the grids above cathode potential.

Thus as each pentode tube reaches saturation successively, a series of voltage steps is generated across the common plate load resistance 418 which may be obtained at the output terminals 419. The voltage steps comprising this series are similar to those produced in the circuit of Figure 2 and similar applications thereof may be employed.

From the foregoing discussion it is apparent that considerable modification of the features of the invention is possible and while the devices herein described and the forms of apparatus for the operation thereof constitute preferred embodiments of the invention it is to be understood that the invention is not limited to these precise devices and forms of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A multiple pulse signal generating system, comprising; signal generator means producing a recurrent signal varying substantially linearly with respect to time during a part of the period thereof, biased electron tube means for deriving a signal which varies in a plurally stepwise manner with respect to time during each of the substantially linearly changing portions of the recurrent signal, and a resonant pulse shaping circuit deriving pulse type signals in response to the stepwise changing signal.

2. Apparatus for the production of a group of signals of selectable group structure comprising, a plurality of multi-grid electronic tubes, a plurality of switching means each connected to a respective one of said electronic tubes for controlling the operation thereof, a source of voltage, a voltage divider providing a plurality of tapped points connected in a closed series circuit with said source of voltage, means connecting each of said electronic tubes to a respective tapped point on said voltage divider, means connected to said closed circuits biasing all of said electronic tubes, means for producing a bias removing signal for the tube grids which varies in amplitude substantially linearly with respect to time at a selected variational frequency connected to said closed circuit, means connected to said electronic tubes responsive to the operation of each to produce an abrupt voltage change, and a resonant pulse shaping circuit connected to the last named means responsive to an abrupt voltage change to produce output pulse signals.

3. A signal generating system, comprising: a plurality of high-vacuum electron tubes with at least anode, cathode and control grid electrodes, a common anode circuit current path including a signal developing impedance for the electron tubes, biasing means for the electron tubes providing the tubes with prearranged different amounts of greater than cut-off biasing voltage, and signal generator means for producing for application to the electron tube grids a recurrent signal varying substantially linearly with respect to time during a part of the period thereof and having a maximum amplitude exceeding the bias greater than cut-off of the most heavily biased electron tube whereby the electron tubes are driven to conduction in succession.

4. A signal generating system, comprising: a plurality of high-vacuum pentode-type electron tubes with at least anode, cathode, and control-grid electrodes, a source of anode circuit power for the electron tubes, a common signal developing loading impedance connected in series with the source of anode circuit power and with the parallel combination of the anode circuits of all of the electron tubes, biasing means connected to the control-grids of the electron tubes for providing the tubes with different amounts of greater than cut-off biasing voltage, signal generator means connected to the electron tube control-grids for producing a recurrent signal varying substantially linearly with respect to time during a part of the period thereof and having a maximum amplitude exceeding the bias greater than cut-off of the most heavily biased electron tube whereby the electron tubes are driven to conduction in succession.

5. A multiple pulse signal generating system, comprising: a plurality of high-vacuum pentode-type electron tubes with at least anode, cathode, and control-grid electrodes, a source of anode circuit power for the electron tubes, a common signal developing loading impedance connected in series with the source of anode circuit power and with the parallel combination of the anode circuits of all of the electron tubes, biasing means connected to the control-grids of the electron tubes providing the tubes with different amounts of greater than cut-off biasing voltage, signal generator means for producing a recurrent signal varying substantially linearly with respect to time during a part of the period thereof and having a maximum amplitude exceeding the bias greater than cut-off of the most heavily biased electron tube, means connecting the output of the signal generator to the control-grids of all of the electron tubes, and a resonant pulse shaping circuit connected across the loading impedance.

ETHEL M. HILFERTY,
*Executrix of the Estate of Daniel J. Hilferty, Deceased.*

REFERENCES CITED

The following references are of record in the file of this patent:

UNITED STATES PATENTS

| Number | Name | Date |
|---|---|---|
| 2,008,563 | Sarbey | July 16, 1931 |
| 2,071,759 | Minorsky | Feb. 23, 1937 |
| 2,409,229 | Smith | Oct. 15, 1946 |
| 2,415,919 | Thomas | Feb. 18, 1947 |